(12) United States Patent
Kehr

(10) Patent No.: US 6,904,777 B2
(45) Date of Patent: Jun. 14, 2005

(54) REMOTE CONTROLLED STEERING COLUMN IGNITION LOCK FOR MOTORCYCLES

(75) Inventor: Ralf Kehr, Pforzheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 74 days.

(21) Appl. No.: 09/828,961

(22) Filed: Apr. 10, 2001

(65) Prior Publication Data

US 2001/0029758 A1 Oct. 18, 2001

(30) Foreign Application Priority Data

Apr. 15, 2000 (DE) .......................................... 100 18 727

(51) Int. Cl.[7] .......................... B60R 25/02; B60R 25/04; E05B 65/12
(52) U.S. Cl. .......................... 70/252; 70/256; 70/279.1; 70/277
(58) Field of Search .......................... 70/252, 256–257, 70/264–279.1, 277–282, 494, 415, 496

(56) References Cited

U.S. PATENT DOCUMENTS

| | | | |
|---|---|---|---|
| 2,964,935 A | | 12/1960 | Lombardi .................... 70/252 |
| 3,241,344 A | * | 3/1966 | Peters ....................... 70/279.1 |
| 3,782,493 A | * | 1/1974 | Lipschutz et al. ...... 123/198 B |
| 4,167,104 A | * | 9/1979 | Bond .......................... 70/208 |
| 4,332,306 A | * | 6/1982 | Turatti ....................... 180/287 |
| 4,837,567 A | * | 6/1989 | Kleefeldt et al. .......... 307/10.5 |
| 5,040,390 A | | 8/1991 | Mistry et al. |
| 5,113,675 A | | 5/1992 | Uyeda |
| 5,124,565 A | * | 6/1992 | Yoshida et al. ............. 180/287 |
| 5,255,547 A | * | 10/1993 | Burr et al. .................... 70/252 |
| 5,291,067 A | * | 3/1994 | Nakajima et al. ........... 180/289 |
| 5,551,267 A | | 9/1996 | Jansen et al. ................. 70/252 |
| 2003/0015006 A1 | * | 1/2003 | Tamukai ...................... 70/186 |
| 2004/0003632 A1 | * | 1/2004 | Ohtaki et al. ................ 70/252 |

FOREIGN PATENT DOCUMENTS

| | | |
|---|---|---|
| DE | 4019478 | 1/1991 |
| DE | 41 02 714 A1 | 1/1991 |
| DE | 197 29 402 A1 | 7/1997 |
| DE | 197 51 805 C1 | 11/1997 |
| DE | 198 36 968 A1 | 8/1998 |
| DE | 198 42 224 A1 | 9/1998 |
| EP | 0 774 405 | 5/1997 |
| EP | 0 860 335 A1 | 2/1998 |
| EP | 0 860 335 | 8/1998 |
| GB | 2 050 492 A | 3/1980 |

OTHER PUBLICATIONS

German Patent Office Search Report and translation of pertinent portions.

* cited by examiner

Primary Examiner—John B. Walsh
(74) Attorney, Agent, or Firm—Crowell & Moring LLP

(57) ABSTRACT

A steering column ignition lock for a motorcycle comprises a lock housing, a closing cylinder, which can be rotated in the lock housing, and closing pins which can be moved in the closing cylinder and can be activated with a key, so that the closing cylinder can be rotated optionally relative to the lock housing or is blocked against rotation. To enable a remote control of the steering column ignition lock, a sleeve is installed rotatably within the lock housing, and the closing cylinder is inserted rotatably within the sleeve. The closing pins can be made to engage with said sleeve so as to block rotation of the cylinder relative to the sleeve. A locking bolt that can be slid in the lock housing can be made to engage with a slotted opening of the sleeve, preventing its rotation relative to the lock housing. The locking bolt has an electromagnet, which can be activated with a remote controller to cause it to disengage with the slotted opening of the sleeve.

10 Claims, 1 Drawing Sheet

REMOTE CONTROLLED STEERING COLUMN IGNITION LOCK FOR MOTORCYCLES

BACKGROUND AND SUMMARY OF THE INVENTION

This application claims the priority of German patent document 100 18 727.7, filed Apr. 15, 2000, the disclosure of which is expressly incorporated by reference herein.

The invention relates to a steering column ignition lock for a motorcycle, having a lock housing that can be fastened to the vehicle. A closing cylinder, which can be rotated in the lock housing, is coupled to a steering locking bolt and to an electric switch for the ignition current. Closing pins, which can be moved in the closing cylinder by means of a key, determine whether the closing cylinder can be rotated relative to the lock housing or is blocked against rotation.

Most motorcycles on the market are provided with a steering column ignition lock of this generic type, which can, however, be actuated only with a key. For this purpose a key is inserted into an opening of the closing cylinder to disengage the closing pins with the lock housing so that the closing cylinder can be rotated into the drive position. On the one hand, this rotation of the closing cylinder into the drive position moves the steering locking bolt out of engagement; and, on the other hand, the electric switch for the ignition current is closed so that the motorcycle is ready to start and drive. Many motorcycle riders perceive this activation of the steering column ignition lock with an appropriate key to be impractical; and there exists a demand for remote control.

One object of the invention is to provide an improved steering column ignition of this type that can be activated by remote control, without the use of a key.

This and other objects and advantages are achieved by the ignition lock according to the invention, in which a sleeve is installed rotatably into the lock housing. The closing cylinder can be rotated in the sleeve, and the closing pins can be made to engage with the sleeve so as to block such rotation. A locking bolt can be slid in the lock housing, and made to engage with a slotted opening of the sleeve. The locking bolt is assigned an electromagnet, which can be activated with a remote controller.

The motorcycle equipped with the steering column ignition lock of the invention can be made ready to start and drive by activating the electromagnet with a remote controller in order to move the locking bolt out of engagement with the slotted opening of the sleeve. Then the sleeve can be rotated by hand together with the closing cylinder into the drive position. If for some reason the locking bolt cannot be moved into its inactive position, for example because the electromagnet is defective or the voltage of the battery is too low, then the closing cylinder can be unlocked with the ignition key in the customary manner and rotated into the driving position.

The locking bolt is biased, preferably by a spring, to engage with the slotted opening of the sleeve. Therefore, the electromagnet need have current only to move the locking bolt out of engagement. Its power consumption is accordingly very low.

An advantageous further development of the invention provides that the periphery of the sleeve exhibits an eccentric, which pushes the locking bolt in the outward direction when the sleeve is rotated into the lock position. The eccentric enables the rider to shut down the motor and to lock the steering column ignition lock without activating the electromagnet with the remote controller. For the purpose of reliability, an electronic activation of the electromagnet for a short period (5 seconds, for example) could prevent an inadvertent deactivation of the motorcycle.

Other objects, advantages and novel features of the present invention will become apparent from the following detailed description of the invention when considered in conjunction with the accompanying drawings.

DETAILED DESCRIPTION OF THE DRAWINGS

Figure 1:
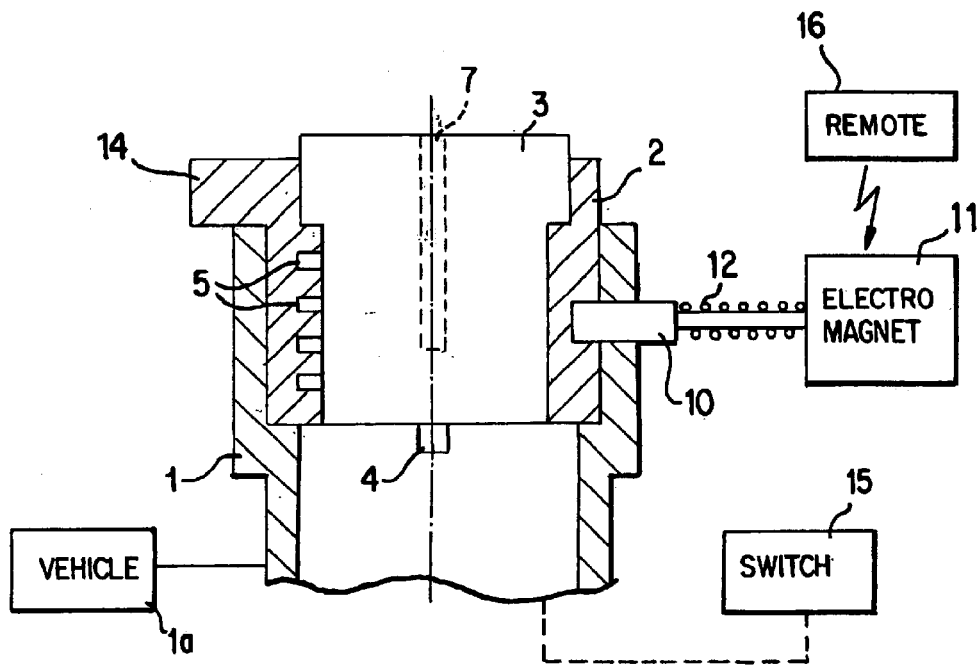
FIG. 1 is a schematic longitudinal view of a remote controlled steering column ignition lock according to the invention.

The remote controlled steering column ignition look, which is depicted in the drawings and is intended for motorcycles, comprises a conventional lock housing 1, which can be fastened rigidly to the vehicle 1a. A rotatable sleeve 2 is inserted into a recessed borehole of the lock housing 1, and a conventional dosing cylinder 3 is disposed rotatably within the sleeve 2. The closing cylinder 3 is connected nonrotatably by means of a bottom extension 4 to a shaft (not shown), which serves to move a steering locking belt into and out of engagement and to open and close an electric switch 15 for the ignition current. Closing pins 5, which can be slid radially in the dosing cylinder 3, can be made to engage with the corresponding locking recesses 6 of the sleeve 2. If an ignition key (not shown) is inserted into an axial opening 7 of the closing cylinder 3 and is rotated, the closing pins 5 are pulled out of the locking recesses 6 of the sleeve 2. Then the closing cylinder 3 can be rotated within the sleeve in order to move the steering locking bolt out of engagement and to close the electric switch for the ignition current so that the motorcycle is ready to start and drive. Since the process for activating the steering column ignition lock with an ignition key is known, there is no need for further explanation.

Figure 2:
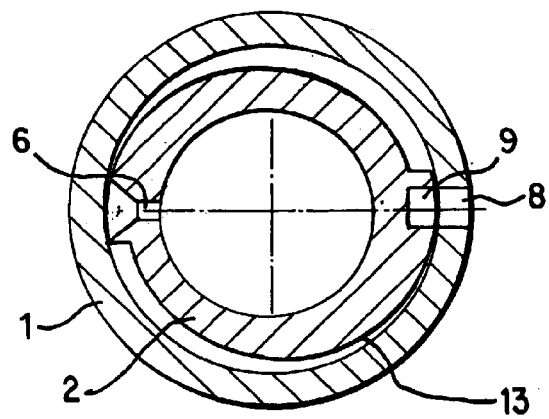
FIG. 2 is a cross section of one area of the steering column ignition lock according to FIG. 1.

The lock housing 1 exhibits a radial borehole 8, which can be brought into coincidence with a slotted opening of the sleeve 2. A locking bolt 10 can be slid in the borehole 8 of the lock housing 1. The locking bolt 10 is connected to an electromagnet 11, which can be activated with a remote controller 16 A compression spring 12 is compressed against the electromagnet 11 and against an annular shoulder of the locking bolt 10, so that the latter is biased to engage with the slotted opening 9. As apparent from the drawing in FIG. 2, the periphery of the sleeve 2, exhibits on a level with the slotted opening 9, two eccentrics 13. whose purpose will be explained below.

FIG. 1 depicts the steering column ignition lock in the blocked state, where the steering locking bolt is moved into engagement and the electric switch for the ignition current is opened. When the motorcycle rider wants to make the motorcycle ready to start and drive, he can activate a control module (not shown) with a conventional remote controller, which is installed for example in the ignition key, in order to connect the electromagnet 11 for a period of approximately 20 seconds with the battery (not shown) of the motorcycle. Consequently, the electromagnet 11, activated in this manner, pulls back the locking bolt 10 against the force of the compression spring 12 so far that it disengages with the slotted opening 9 of the sleeve 2. Thus, the form fit connection of the sleeve 2 with the lock housing 1 is cleared so that the motorcycle rider can grasp and rotate the sleeve 2 at three projections 14 which are offset by 120° (one being shown in FIG. 1).

Since the closing cylinder 3 is rotationally fixed relative to the sleeve 2 by means of the closing pins 5, it automatically rotates together with the sleeve. Therefore, the steering locking bolt is moved out of engagement, and the electric switch for the ignition current is closed so that the motorcycle is ready to start and drive. As soon as the electromagnet 11 is currentless, the compression spring 12 pushes the locking bolt 10 against the eccentric 13 of the sleeve 2. Since the locking bolt 10 rests against the eccentric 13 under the initial stressing force of the compression spring 12, an unintentional rotation of the sleeve 2 into the blocking position, where the locking bolt 10 could engage with the slotted opening 9, is prevented. Since the electromagnet 11 serves only to unlock the steering column ignition lock, high operating reliability is achieved because the operating state of the electromagnet 11 is irrelevant as soon as the sleeve 2 is located in the drive position.

To block the steering column ignition lock, the rider can rotate the sleeve 2 by hand so that the locking bolt 10, resting against the eccentric 13, is pushed in the outward direction. As soon as the sleeve 2 is rotated so far that the slotted opening 9 aligns with the borehole 8 of the lock housing 1, the locking bolt 10 engages with the slotted opening 9 under the initial stressing force of the compression spring 12. Therefore, the sleeve 2 is blocked against rotation relative to the lock housing 1. Since the closing cylinder 3 in turn is connected by means of the closing pins 5 to the sleeve 2 so as not to rotate, it was rotated together with the sleeve 2 so that the steering locking bolt was moved into engagement and the electric switch for the ignition current was opened.

Should it ever occur that the electromagnet 11 cannot be activated with the remote controller, for example because the battery voltage is too low, the locking bolt 10 cannot be pulled back out of the slotted opening 9 of the sleeve 2. In this case, however, the steering column ignition lock can be opened in the conventional manner with the ignition key. As stated above, the closing pins 5 can be made to disengage with the locking recesses 6 of the sleeve 2 with the ignition key so that the closing cylinder 3 can be freely rotated.

The remote controller for activating the electromagnet 11 can serve simultaneously to activate the central locking system. An especially advantageous central locking system for such motorcycles is one that exhibits several lockable flaps, such as a storage box flap, gas cap flap, radio recess flap or the like.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering column ignition lock having a lock housing for fastening to a vehicle, a closing cylinder that is rotatable in the lock housing and is coupled to a steering locking mechanism and to an electric switch for ignition current, and closing pins that are movable in the closing cylinder by means of a key, whereby the closing cylinder either can be rotated relative to the lock housing or is blocked against rotation, wherein:

a sleeve is installed rotatably into the lock housing, with the closing cylinder inserted rotatably into the sleeve;

the closing pins are engageable with said sleeve to block relative rotation between the sleeve and the closing cylinder;

a locking bolt is slidable within the lock housing to engage with a slotted opening of the sleeve, blocking rotation of the sleeve relative to the housing; and the locking bolt has an electromagnet that is activatable with a remote controller to withdraw said locking bolt from engagement with the slotted opening of the sleeve.

2. The steering column ignition lock, as claimed in claim 1, wherein the locking bolt is spring biased to engage with the slotted opening of the sleeve.

3. The steering column ignition lock, as claimed in claim 1, wherein a periphery of the sleeve has an eccentric, which pushes the locking bolt in a radially outward direction when the sleeve is rotated into a lock position thereof.

4. The steering column ignition lock, as claimed in claim 1, further comprising the remote controller for activating a central locking system.

5. The steering column ignition lock according to claim 1, wherein said vehicle is a motorcycle.

6. An ignition lock for a vehicle, comprising:

a hollow cylindrical housing for mounting on the vehicle;

a hollow cylindrical sleeve inserted rotatably within the housing;

a closing cylinder inserted rotatably within the sleeve, said cylinder being operatively coupled to activate at least one of a steering locking mechanism and a vehicle ignition switch by rotation thereof relative to the housing;

closing pins which are movable in the cylinder to engage with the sleeve for preventing rotation of the cylinder relative to the sleeve, and are movable out of engagement with the sleeve for permitting rotation of the cylinder relative to the sleeve in response to insertion of a key into the cylinder;

a locking bolt which is movable in the housing, between a first position in which rotation between the sleeve and the housing is permitted, and a second position in which rotation between the sleeve and the housing is blocked; and a remotely actuatable mechanism for controlling movement of the locking bolt between the first and second positions.

7. An ignition lock for a vehicle according to claim 6, wherein said remotely actuatable mechanism comprises an electromagnet.

8. An ignition lock for a vehicle according to claim 7, wherein:

the locking bolt is spring biased into the second position; and actuation of the electromagnet causes said locking bolt to move into the first position.

9. An ignition lock for a vehicle according to claim 6, wherein a periphery of the sleeve has an eccentric which moves the locking bolt radially outwardly when the sleeve is rotated into a lock position.

10. An ignition lock for a vehicle according to claim 6, wherein the vehicle is a motorcycle.

* * * * *